United States Patent [19]

Kitts

[11] Patent Number: 4,853,676
[45] Date of Patent: Aug. 1, 1989

[54] SECURITY DEVICE

[75] Inventor: Jacques B. Kitts, South Croydon, England

[73] Assignee: Cardgard Ltd., Gloucester, England

[21] Appl. No.: 172,327

[22] Filed: Mar. 23, 1988

[30] Foreign Application Priority Data

Mar. 27, 1987 [GB] United Kingdom ............... 8707339

[51] Int. Cl.⁴ ..................... E05B 45/06; H01H 47/00
[52] U.S. Cl. ..................................... 340/543; 109/33; 109/37; 340/636; 361/172
[58] Field of Search ........... 340/543, 568, 571, 825.31, 340/825.33, 63–64, 636, 825.32; 109/29–44; 241/17; 361/172; 206/807

[56] References Cited

U.S. PATENT DOCUMENTS

| | | | |
|---|---|---|---|
| 3,349,729 | 10/1967 | Olivier | 109/25 |
| 4,105,156 | 8/1978 | Dethloff | 235/441 |
| 4,152,988 | 5/1979 | Haas et al. | 102/202.11 |
| 4,236,463 | 12/1980 | Westcott | 109/33 |
| 4,352,097 | 9/1982 | Hamann | 340/571 |
| 4,573,043 | 2/1986 | Heuker of Hoek et al. | 340/571 |
| 4,640,724 | 2/1987 | Carter et al. | 149/109.6 |
| 4,712,489 | 12/1987 | Levavasseur | 109/25 |
| 4,725,823 | 2/1988 | Persson | 340/571 |

FOREIGN PATENT DOCUMENTS

| | | |
|---|---|---|
| 0021670 | 1/1981 | European Pat. Off. ............ 340/543 |
| 0190778 | 8/1986 | European Pat. Off. . |
| 2006322 | 5/1979 | United Kingdom . |
| 2027118 | 2/1980 | United Kingdom . |
| 2158508 | 11/1985 | United Kingdom . |

Primary Examiner—Glen R. Swann, III
Assistant Examiner—Thomas J. Mullen, Jr.
Attorney, Agent, or Firm—Ladas & Parry

[57] ABSTRACT

A security device for credit cards, charge cards, cash cards and the like has a base, an integrally molded top partially extending along the length of the base and a lid pivotally secured to one end of the base. A key pad is recessed into the top. The lid has an electrically operated latch operated by the key pad. A cartridge for the cards is formed of cardboard bent into a serpentine format to provide an upper compartment and a lower compartment, each compartment being suitable for holding up to four cards each. The internal surfaces of the cartridge are coated with a pyrotechnic material and a heating coil is connected to the cartridge. An authorized user of the device has a personal code which when inputted via the key pad opens the lid. Incorrect input of the code causes a piezoelectric bleeper to sound. Two incorrect input sequences are permitted but on the third incorrect sequence the coil causes the pyrotechnic solution on the cartridge to heat up and destroy the cards within the device. A water tamper device is provided which will also cause the cartridge to destroy the cards if the device is immersed in water. A conductive inlay is provided around the inside of the device so that if the inway is open circuited by an unauthorized attempt at entry into the device by, for example, drilling or sawing, the cartridge will again destroy the cards held within the device.

16 Claims, 3 Drawing Sheets

SECURITY DEVICE

This invention relates to a security device arranged to hold one or more credit cards, charge cards, cash cards and the like against theft and misuse by other than the authorised holder.

The known arrangements for protecting such cards are restricted to registration of the cards at a central station so that upon loss of the cards the authorised holder reports the loss to the central station rather than to all card issuing offices, thereby simplifying the action required to be taken and limiting the amount of time which the card holder is held responsible for unauthorised use of the card. The presently known method does not actually prevent or avoid the unauthorised use of the card or cards by other than the authorised card holder, leaving the issuing companies and insurance companies to bear losses due to unauthorised use, the authorised holder also normally being liable for some unauthorised use.

The present invention seeks to provide a security device for credit cards, charge cards, cash cards and the like which prevents unauthorised use thereof.

According to this invention there is provided a security device arranged to hold at least one credit card, charge card, cash card or the like comprising a container having a lid, locking means arranged to secure said lid to said container until said locking means are released, defacing means within said container for defacing said cards, trigger means arranged to be activated by said locking means for triggering said defacing means, and counting means for permitting a predetermined number of incorrect attempts at operating said locking means before said locking means activates said trigger means to trigger said defacing means.

Preferably said counting means is connected to a warning device arranged to produce a signal indicative of each incorrect operation of said locking means.

Conveniently said warning device is an audible buzzer, and advantageously the defacing means is activated on the third incorrect operation of said locking means.

In a preferred embodiment, at least one compartment is provided for cards in said container and the defacing means is a waterproof pyrotechnic solution coated on the internal surfaces of said at least one compartment.

Conveniently said pyrotechnic solution is safety match compound waterproofed by a solution of 10% by volume shellac and methylated spirit.

Advantageously two compartments are formed by folding cardboard, the internal surfaces of which are coated with the waterproof pyrotechnic solution.

Conveniently the locking means comprises a digital key pad arranged to apply signals to an electrical circuit means which includes said trigger means, said counting means and a relay, whereby correct operation of said key pad actuates said relay to release said lid.

Advantageously said key pad and said electrical circuit means is capable of accepting up to seven digits keyed in a correct sequence as being indicative of a user's personal code.

Conveniently said key pad and said electrical circuit means are adapted to permit a user to enter or change a user's personal code.

Preferably the container and the lid have an electrically conductive layer built thereinto which is connected to said electrical circuit means and which layer when open circuited by other than correct operation of said key pad actuates said trigger means to trigger said defacing means.

Advantageously a water tamper means is provided connected to said electrical circuit means, whereby when said device is immersed in water said water tamper means produces an electrical signal to activate said trigger means to trigger said defacing means.

Preferably said water tamper means comprise means for determining a change in resistance between a pair of adjacent conductive members, said conductive members being in fluid communication with aperture means in said container for permitting water to pass therethrough onto said conductive members.

Normally the circuit means is energised by at least one electrical cell and advantageously an audible indicator is provided for indicating when said cell voltage is below a predetermined value.

Preferably the container comprises a base portion and a top portion in which said key pad is located, said top portion extending partially along the length of said base portion, said lid being pivotally attached to one end of said base portion and adapted to close the remaining length of said base portion and to be congruent with said top portion.

The invention will now be described by way of example with reference to the accompanying drawings in which.

In the Figures like reference numerals denote like parts.

Figures 1, 2:
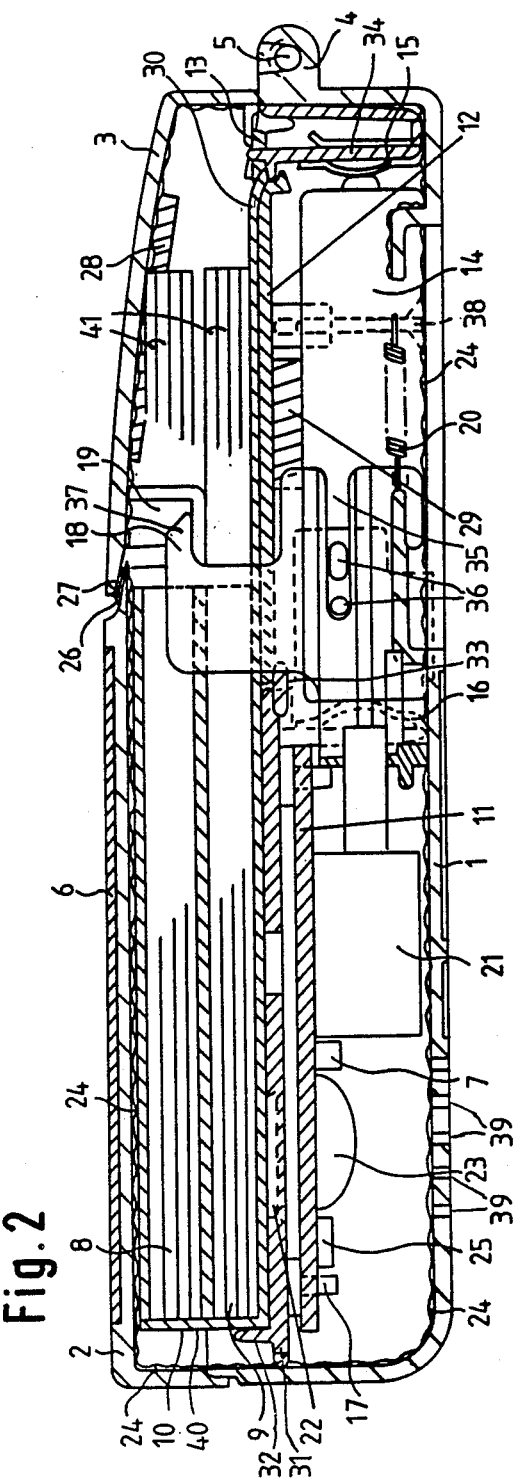
FIG. 1 shows a perspective view of a security device in accordance with this invention.
FIG. 2 shows a longitudinal cross-section through the security device of FIG. 1.
Figure 3:
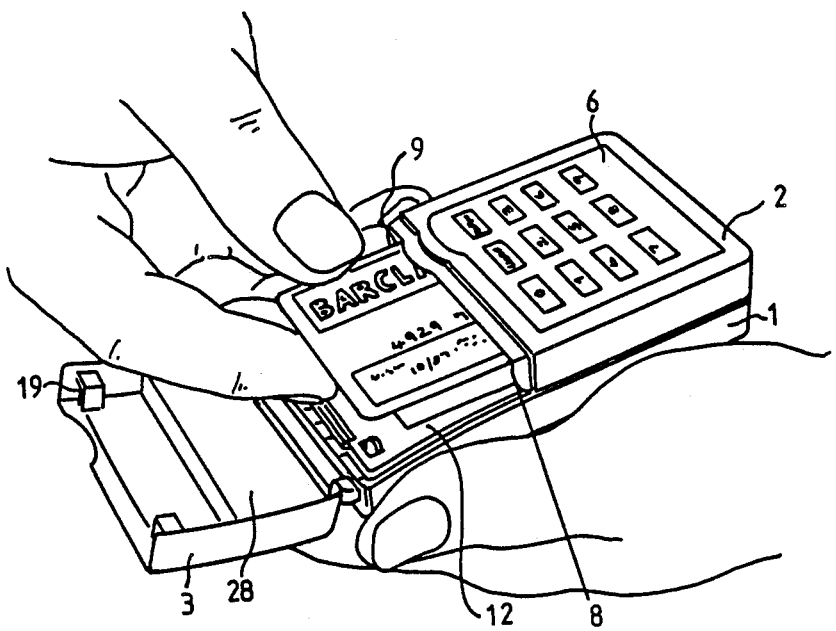
FIG. 3 shows a perspective view of the security device with the lid opened.

The security device shown in FIG. 1 has a base 1, an integrally moulded top 2 partially extending along the length of the base and a lid 3 pivotally secured to one end of the base 1 by a hinge 4, the lid 3 extending over the remaining part of the base 1 not covered by the top 2 and being contiguous with the top 2. A key pad 6 is recessed into the top 2. The base 1, top 2 and lid 3 are moulded of high density ABS plastic and the joints of the parts are ultrasonically welded. When the lid is hinged open as shown in FIG. 3, access to credit cards, charge cards, cash cards and the like is afforded.

Referring now to FIG. 2, the hinge 4 is formed by two spaced bosses integrally moulded with the base 1 and a stainless steel hinge pin 5 connected to the lid 3 is inserted into the bosses. The base has a platform 31 with an upstanding edge 32 and a continuation of the platform 31 is formed by a cell (battery) cover 12. The cell cover 12 is located rearwardly upon a moulded member 33 and a forward end of the cover 12 has a lip which engages with a wall 34 that is spring biased by a spring 13 to permit removal of the cover 12. Four AAA size cells 14 are employed and connected between terminals 15 and 16 and a polyester foam packing 29 is provided to restrain the cells 14 in position.

Figure 6:
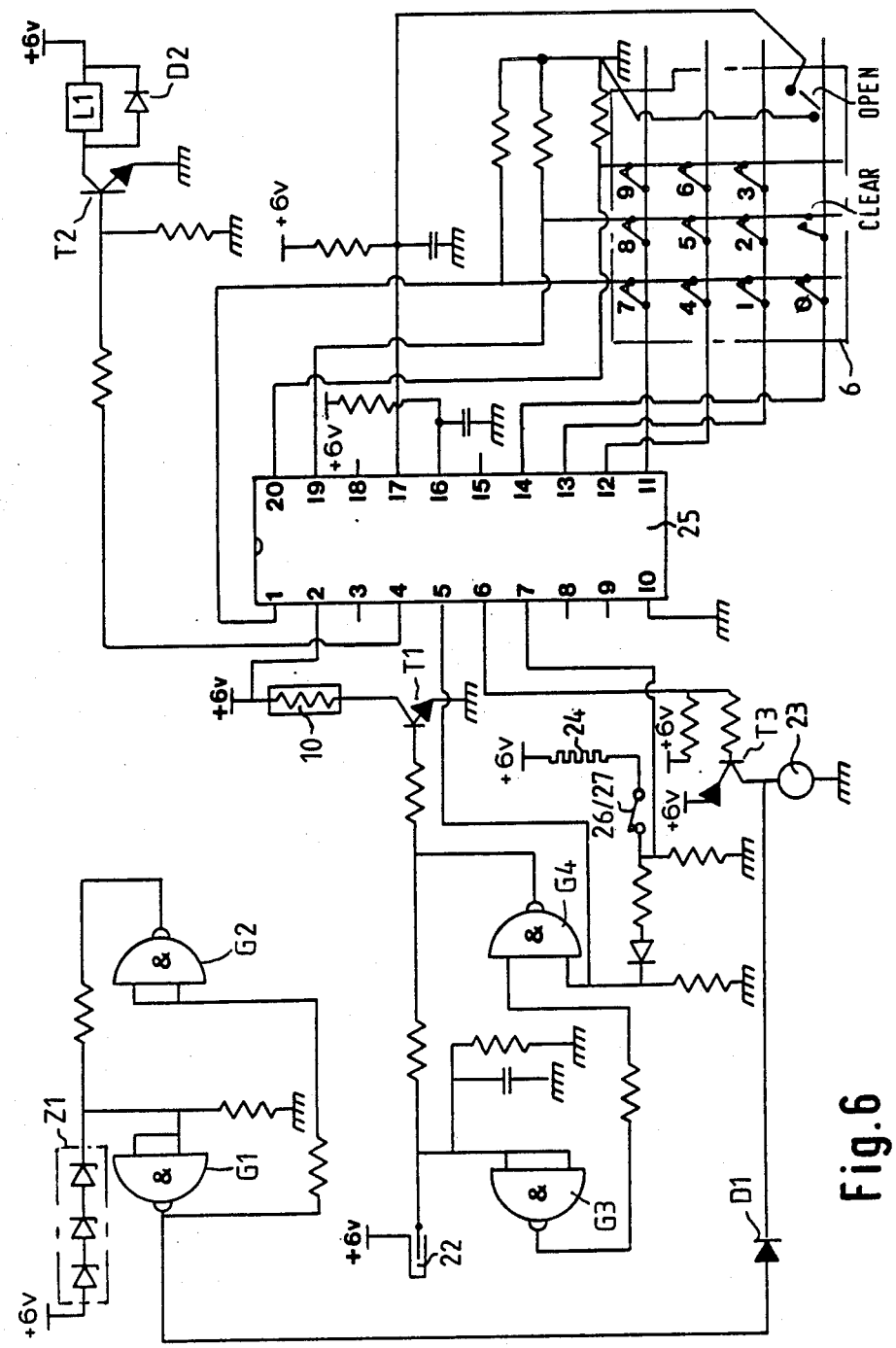
FIG. 6 shows a circuit diagram of the device.

A printed circuit board 11 for the components shown in FIG. 6 is supported under the platform 31 by retaining pins 17. The printed circuit board 11 supports, inter alia, a water tamper device 22, a microprocessor 25, a pietzoelectric bleeper 23, an electrical connector 7 and a solenoid 21. The solenoid 21 is connected to reciprocate a latch 18 which is biased toward the hinge 4 by two spaced tension springs 20. The springs 20 each have one end attached to the latch 18 and the other end thereof secured to a pillar 38. The latch 18 has a notch 35 within which are located transverse pins 36, the combination of notch 35 and pins 36 ensuring accurate translational movement of the latch 18. The latch 18 has a lip 37 which cooperates with a blind recess 19 in the lid 3. Thus when the solenoid is operated it pulls the latch 18 against the bias exerted by springs 20 to move the lip 37 out of the recess 19 so that the lid may then be opened.

Located on the inner surfaces of the base 1, top 2 and lid 3 is a conductive inlay formed by a plurality of closely spaced conductive strips extending in a continuous fashion longitudinally around the device. The conductive inlay comprises an adhesive layer, a layer of polyester substrate, a printed layer of conductive ink, a polyester spacer layer and a top layer printed black. The conductive inlay is 0.22 mm thick and at the junction between the lid 3 and top 2 the polyester spacer layer is exposed to produce a conductive area 27 on the lid which is arranged to mate with a beryllium copper spring contact 26 on the top 2 so that an electrical circuit is completed thereby, the inlay being connected to the printed circuit board via the connector 7. The arrangement is such that as soon as the electrical circuit is broken by the lid being opened, the change in electrical resistance is detected by the electrical circuit of FIG. 6.

The water tamper device 22 comprises two exposed electrically conductive tracks of copper extending closely adjacent to one another in a zig-zag manner such that in the event the area between the conductive tracks becomes wet due to the device being immersed in liquid then the change in resistance between the two paths is detected by the circuit shown in FIG. 6 and a warning sounded. The base 1 has a plurality of apertures 39 positioned such that water may pass therethrough onto the device 22.

Figure 4:
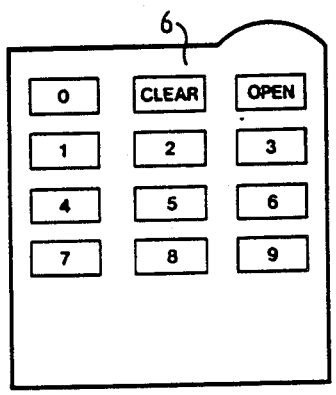
FIG. 4 shows a detailed plan view of the key pad.

The key pad 6 is inset into the upper surface of the top 2 and held in position by adhesive. The key pad has twelve keys marked with numbers 0 to 9, a "clear" key and an "open" key (see FIG. 4), the functions of the keys being explained later herein.

Figure 5:
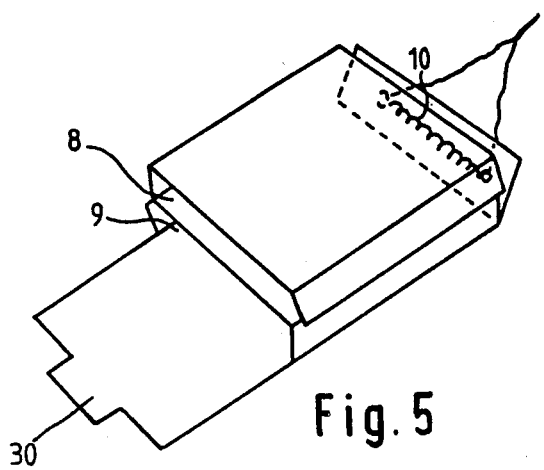
FIG. 5 shows a perspective view of a pyrotechnic cartridge for use in the device.

A cartridge for credit cards, shown in FIG. 5, is formed of cardboard bent into a serpentine format to provide an upper compartment 8 and a lower compartment 9 with a tail 30 for securing the cartridge in position between the cell cover 12 and its retaining spring 13. The partitions 8 and 9 are of sufficient size to each hold four cards 41 and a foam backing 28 is provided on the inside of the lid 3 for the cards. The cartridge has a rear wall 40 which abuts against the edge 32 and a nickle iron coil 10 is formed in the rear wall 40, suspended between eyelets and connected as shown in FIG. 6. The cartridge has inner surfaces adjacent to the cards which are coated with a pyrotechnic composition formed by mixing twenty four parts antimony sulfide, twenty two parts potassium chlorate, twelve parts potassium dichromate, twenty two parts red lead, and gum, such composition being a standard safety match composition. The composition is rendered waterproof by mixing in a 10% by volume solution of shellac and methylated spirits, the shellac providing waterproofing; the composition is spread to a thickness of 0.25 mm on the inner surfaces of the compartments 8, 9. When heated by the coil 10 the pyrotechnic composition heats and burns the cards located within the cartridge, the extent of damage being restricted to the cartridge and the outer casing remaining cool and undamaged. In destroying the cards not only are they physically defaced but the heat produced is such as to destroy any magnetic information encoded within the cards.

Referring now to FIG. 6, NAND gates G1-G4 are formed by an integrated circuit, IC 4011 CMOS manufactured, for example, by Motorola Inc. and the combination of zener diodes Z1, NAND gates G1, G2 formed into a Schmidt trigger, provides a low voltage threshold detector which applies a signal to piezoelectric bleeper 23 via diode gate D1 when the voltage of the supply falls below 4.5 volts. The bleeper 23 also sounds each time a key is depressed.

The solenoid 21 has a coil L1 with a parallel connected diode D2 for protecting NPN transistor T2. The solenoid may be operated by a user pressing a correct sequence of keys (a user's personal code), the code being preset and containing up to seven digits, normally between four and seven digits.

When the "clear" key is pressed, the microprocessor 25 is activated from its "sleep" mode for a period of thirty seconds. This time is sufficient to allow a user to enter his personal code and for the "open" key to be activated. If a user should push an incorrect key prior to pressing the "open" key, the code thus far entered may be cleared by pressing the "clear" key.

The microprocessor returns to the "sleep" mode thirty seconds after the lid is closed or if the "clear" key is pressed. In the "sleep" mode the device has an extremely low current drain on the cells and pressing of any key other than the "clear" key has no effect.

Provided the correct sequence of numbers has been entered by a user, i.e. the "clear" key is pressed followed by the four or up to seven digit user's personal code and the "open" key is pressed, transistor T2 conducts and the coil L1 of solenoid 21 is energised to thereby slide latch 18 to permit the lid 3 to open.

If an incorrect entry is keyed in by the user the following events take place:

First attempt: press "clear" key followed by an incorrect user's personal code, press "open"; the result is that the pin 6 of microprocessor 25 presents a low voltage causing transistor T3 to conduct so that the bleeper 23 is energised for a continuous period of five seconds.

On the second attempt when the "clear" key is pressed followed by an incorrect user's personal code and the "open" key pressed, similar states occur as before except that the microprocessor is arranged to produce an oscillating output on pin 6 to cause bleeper 23 to sound an intermittent five second audible warning.

With a third unsuccessful attempt at inputting a user's personal code output pin 5 of micro-processor 25 presents a low voltage causing the output of NAND gate G4 to go toward plus 6 volts which in turn causes transistor T1 to switch on. In conducting, transistor T1 causes the coil 10 to heat up to a temperature such that the pyrotechnic composition scorches cards within the device.

When an incorrect user's personal code is entered and the "open" key is pressed one of the three available "lives" is used. The initial situation of having three "lives" cannot be restored until a correct user's personal code is entered and the "open" key pressed. The effect of entering a correct user's personal code and opening the device restores the initial condition of three "lives" being available.

If an attempt is made to force entry to the device by sawing, drilling etc. then the conductive inlay 24 is open circuited and the lower input of gate G4 drops in voltage causing the output of the gate to rise turning transistor T1 on and causing coil 10 to heat up. A similar action is caused by contact 26, 27 being improperly opened. When water enters the water tamper device 27 a reduction in impedance causes the inputs of gate G3 which are normally at low voltage so the output of gate G3 is high, to increase thereby causing the output of gate G3 to go low voltage which in turn causes gate G4 to trigger transistor T1 on and coil 10 to heat up. The action of gates G3 and G4 by being connected in a feed-back arrangement ensures a stable operation.

To change a user's personal code, the cells 14 are removed thereby cutting off power supply to the microprocessor 25. The effect of cutting off power to the microprocessor erases the personal code held in the internal memory, equivalent to setting a user's personal code to four zeros.

Following the replacement of the cells, key "clear" is pressed followed by the "7" key and the desired user's personal code is inputted and the "open" key pressed. The user's personal code is now contained in the microprocessor.

I claim:

1. A security device arranged to hold at least one credit card, charge card, cash card and the like comprising a container having a lid, at least one compartment for cards in said container, locking means arranged to secure said lid to said container until said locking means are released, a waterproof pyrotechnic solution coated on the internal surfaces of said at least one compartment for destroying said cards, trigger means arranged to be activated by said locking means for triggering said pyrotechnic solution, and counting means for permitting a predetermined number of incorrect attempts at operating said locking means before said locking means activates said trigger means to trigger said pyrotechnic solution.

2. A security device as claimed in claim 1 wherein said counting means is connected to a warning device arranged to produce a signal indicative of each incorrect operation of said locking means.

3. A security device as claimed in claim 2 wherein said warning device is an audible buzzer.

4. A security device as claimed in claim 2 wherein the pyrotechnic solution is activated on the third incorrect operation of said locking means.

5. A security device as claimed in claim 1 wherein said pyrotechnic solutuion is safety match compound waterproofed by a solution of 10% by volume shellac and methylated spirit.

6. A security device as claimed in claim 1 wherein two compartments are formed by folding cardboard, the internal surfaces of which are coated with the waterproof pyrotechnic solution.

7. A security device as claimed in claim 1 wherein the locking means comprises a digital key pad arranged to apply signals to an electrical circuit means which includes said trigger means, said counting means and a relay, whereby correct operation of said key pad actuates said relay to release said lid.

8. A security device as claimed in claim 7 wherein said key pad and said electrical circuit means is capable of accepting up to seven digits keyed in a correct sequence as being indicative of a user's personal code.

9. A security device as claimed in claim 8 wherein said key pad and said electrical circuit means are adapted to permit a user to enter or change a user's personal code.

10. A security device as claimed in claim 7 wherein the container and the lid have an electrically conductive layer built thereinto which is connected to said electrical circuit means and which layer when open circuited by other than correct operation of said key pad actuates said trigger means to trigger said pyrotechnic solution.

11. A security device as claimed in claim 7 wherein a water tamper means is provided connected to said electrical circuit means, whereby when said device is immersed in water said water tamper means produces an electrical signal to activate said trigger means to trigger said pyrotechnic solution.

12. A security device as claimed in claim 11 wherein said water tamper means comprise means for determining a change in resistance between a pair of adjacent conductive members, said conductive members being in fluid communication with aperture means in said container for permitting water to pass therethrough onto said conductive members.

13. A security device as claimed in claim 7 wherein the circuit means is energised by at least one electrical cell and an audible indicator is provided for indicating when said cell voltage is below a predetermined value.

14. A security device as claimed in claim 1 wherein the container comprises a base portion and a top portion in which said key pad is located, said top portion extending partially along the length of said base portion, said lid being pivotally attached to one end of said base portion and adapted to close the remaining length of said base portion and to be congruent with said top portion.

15. A security device arranged to hold at least one credit card, charge card, cash card and the like comprising a container having a lid, locking means arranged to secure said lid to said container until said locking means are released, defacing means within said container for defacing said cards, trigger means arranged to be activated by said locking means for triggering said defacing means, counting means for permitting a predetermined number of incorrect attempts at operating said locking means before said locking means activates said trigger means to trigger said defacing means, said locking means including a digital keypad arranged to apply signals to an electrical circuit means which includes said trigger means, said counting means and a relay, whereby correct operation of said keypad activates said relay to release said lid, and a water tamper means connected to said electrical circuit means, whereby when said device is immersed in water said water tamper means produces an electrical signal to activate said trigger means to trigger said defacing means.

16. A security device as claimed in claim 15 wherein said water tamper means comprise means for determining a change in resistance between a pair of adjacent conductive members, said conductive members being in fluid communication with aperture means in said container for permitting water to pass therethrough onto said conductive members.

* * * * *